United States Patent [19]

Buckman et al.

[11] 4,268,403
[45] May 19, 1981

[54] OIL RECOVERY USING A DIMETHYLAMIDE IN A FLUID CARRIER

[75] Inventors: Robert H. Buckman, Memphis, Tenn.; Peter J. Young, Calgary, Canada; Miguel L. Pulido, Memphis, Tenn.

[73] Assignee: Buckman Laboratories, Inc., Memphis, Tenn.

[21] Appl. No.: 88,260

[22] Filed: Oct. 25, 1979

[51] Int. Cl.$^3$ .............................................. E21B 43/22
[52] U.S. Cl. ................................ 252/8.55 D; 166/303; 166/305 R
[58] Field of Search ........................ 252/8.55 D, 357; 166/272, 274, 275, 303, 305 R

[56] References Cited

U.S. PATENT DOCUMENTS

| | | | |
|---|---|---|---|
| 2,302,697 | 11/1942 | Katzman | 252/357 |
| 2,882,973 | 4/1959 | Doscher et al. | 166/275 X |
| 3,396,792 | 8/1968 | Muggee | 166/272 |
| 3,421,582 | 1/1969 | Fallgatter | 252/8.55 X |
| 3,469,630 | 9/1969 | Hurd et al. | 166/273 X |
| 3,811,504 | 5/1974 | Flournoy et al. | 252/8.55 X |
| 4,071,458 | 1/1978 | Allen | 252/8.55 |

*Primary Examiner*—Herbert B. Guynn
*Attorney, Agent, or Firm*—Floyd Trimble

[57] ABSTRACT

A method for recovering oil from an oil-bearing formation which comprises introducing into said formation to induce displacement of the oil contained therein, a fluid carrier containing from about 0.25 to about 100 parts by weight of a N,N-dimethylamide of a straight chain carboxylic acid per million parts of said fluid carrier, characterized in that said carboxylic acid contains from 12 to 18 carbon atoms. In addition, this invention encompasses the extraction of oil from mining oil sand operations which comprises the addition and then mixing into said sand to induce displacement of the oil contained thereon, a fluid carrier containing the N,N-dimethylamide.

20 Claims, No Drawings

OIL RECOVERY USING A DIMETHYLAMIDE IN A FLUID CARRIER

This invention relates to an improved method for the recovery of petroleum oils from an oil-bearing formation which may be in the form of in situ oil sand, oil sand obtained by surface mining, oil shale, or conventional heavy oil formations. More particularly, this invention relates to steam stimulation methods for the recovery of petroleum oils including heavy crude oils from subterranean oil sands and/or other oil-bearing strata.

Primary production of petroleum hydrocarbons from an oil-bearing formation is usually effected by drilling through or into the oil-bearing sand or other oil-bearing strata. This allows the oil to flow from the formation into the bore hole from which the oil may be recovered by conventional means such as flowing or pumping. In the United States, Canada, and generally true in other oil producing countries, primary production has recovered only about 25 percent of the oil in place. Various methods have been proposed and used in an attempt to increase the recovery of the oil. These are generally known collectively as secondary methods. One of the first proposals was water flooding, whereby another about 10 percent of the oil can be recovered which means that some 65 percent of the oil is still in the ground. As an improvement to the water flooding process, carbon dioxide has been injected into the well along with water; and this modification has, in many cases, increased the oil recovery by as much as 50 percent over conventional water flooding.

Other methods used for increasing the recovery of oil, sometimes called stimulation techniques, include the heating of the formation by means of preheated fluids, e.g., gases, steam, or hot water, and combustion in situ.

One commonly used method for stimulation of oil production in oil wells is the injection of steam into the formation; and for additional background on this method, reference is made to "Steam in Oil Production," by T. M. Doscher, pp 5861, The Oil and Gas Journal, Nov. 22, 1965. The primary function of the steam in steam stimulation methods is to deliver heat to the reservoir formation, heating the residual or high-viscosity oil so that its viscosity is lowered and it flows more readily through the formation.

The usual stimulation technique, sometimes called "the huff and puff process" comprises placing a steam generator near the well at the surface, injecting steam through the tubing or casing of the well into the producing formation for a desired time period, shutting in the well to permit "soaking" for a second period of time, and then producing the well by conventional primary recovery methods. Steam may also be employed to stimulate production at production wells adjacent to the injection well into which it is pumped. Although the results of steam simulation vary, the more successful applications result in substantial increase in the rate of oil production persisting for up to one year.

One particularly troublesome side effect of steam simulation in many wells is the production of a tight emulsion of oil and water in greater volume than that of the emulsion normally found in the effluent of those wells. The combined effect of heat and motion of the steam forced into the oil-bearing formation produces a water-in-oil emulsion between oil and connate water or oil and the injected steam condensate.

Unfortunately, certain types of crude which best respond to thermal recovery methods, e.g., steam stimulation, are also among those which most readily form extremely tight water-in-oil emulsions. This tendency is probably due to the fact that the specific gravity of these particular crudes is very close to that of water.

Another unfortunate tendency of steam stimulation methods is that of diluting the salts naturally found in the oil-bearing formation. As is well known, certain of these naturally occurring salts exhibit a tendency to precipitate certain dispersed systems. Thus, the presence of these natural salts in, say, primary production crudes, makes it relatively easy to break the relatively small amount of naturally occurring connate water-in-oil emulsion found therein. In steam stimulation methods, however, fresh water is generally employed, both because of the immediate availability at the well site of relatively fresh water and because the water used is often also treated to avoid deleterious effects on the water heating apparatus such as corrosion and the formation of heavy boiler scale. The addition of this fresh water, injected in the form of steam, to the connate water in the formation tends to dilute the salt content of the total water in the formation. So diluting the salt content of the total water in the formation, however, reduces the beneficial effects derived from the presence of the salt, both the tendency of salt in the formation to prevent emulsification, and the tendency of the salt carried with the crude to reduce the amount of precipitating or deemulsifying chemical necessary to be added to the crude in the processing plant. Thus, steam stimulation has at least two unfortunate, co-acting concomitants which tend to produce undesired emulsions in the crude so produced, or to magnify the problems of dealing with such emulsions. The first of these concomitants is the tendency of the type of crude in which steam stimulation is most effective to form the tightest emulsions, while the second of these concomitants is the dilution of the salts naturally occurring in the formation by the fresh water used in steam stimulation.

In subsequent production of the well, this additional emulsion must be broken to separate the water from the oil in order to make the oil saleable. It has been found that often greater heat is required in the treating system, more de-emulsifying chemical is needed in the produced fluid, and longer retention time is necessary in the treating system in order to remove the water (dispersed phase) from the oil (continuous phase) when steam stimulation has been used. These added, or more time-consuming steps and the use of additional heat, chemicals, or both, result in considerable additional cost increases for treating the additional emulsion caused by steam stimulation.

Perhaps even more important than the additional cost increases of treating the additional emulsion caused by steam stimulation, is the operational problem caused when a highly emulsified well is put on production. This may be particularly true, for instance, in the case of a well which was not highly emulsified during primary production, but which, on secondary recovery by steam stimulation, produces a highly emulsified fluid. The added emulsion often cannot be adequately handled in the existing treating equipment (designed for low emulsion primary production). Therefore, the storage tanks begin to receive oil containing more water than is acceptable for shipment. This means that the total production of the treating system must be curtailed until the emulsion problem can be resolved. Resolution of the emulsion problem may involve, however, extensive supplementation of the treating system by way of the addition of considerable amounts of equipment, e.g., storage tanks, heat treaters, wash tanks, de-emulsifiers, chemical storage facilities, etc.

The above discussion with respect to water-in-oil emulsion is equally and totally applicable to oil-in-water emulsions which are also created by steam application. In addition to treatment of conventional wells, this application is concerned with the enhanced recovery of oil from oil sands and oil shale. Firstly, fluid mediums such as water, steam, or hydrocarbons are used to recover oil from in-situ oil sands. Enhancement of oil recovery from in-situ operations is one of the principal applications of the method described in the disclosure. The benefits result from flow improvement of the oil in the formation. The effect of application of the method is to increase the volume of oil produced from the sand per unit of energy injected into the formation. The same arguments apply, of course, to this method of in-situ recovery of shale oil.

In shallow oil sands, formations for which mining recovery is feasible, the application of this method in the oil extraction process is intended. By the same effect of removing oil from sand, this method will increase the volume of oil produced per unit of energy employed.

In summation, although a great deal of effort has been expended heretofore in attempts to recover greater percentages of the oil still in the ground, none of these proposed methods have been entirely satisfactory. Some because of the expenses and/or the complex and difficult operational procedures involved. Furthermore, all of the methods heretofore proposed share the common deficiency in that only a relatively small amount of additional of the residual oil is recovered. Although the authorities may disagree on the actual amount of residual oil still in the ground, most agree that this amount is greater than 50 percent.

It is, therefore, a principal object of the present invention to provide a composition and process useful for the recovery of oil from oil-bearing formations which obviates the disadvantages of the prior art oil recovery methods.

It is another object of our invention to provide a composition and process for the recovery of oil from an oil-bearing strata that is more efficient and economical.

It is yet another object of this invention to provide a process for the recovery of oil from oil-bearing formations whereby greater percentages of the oil can be recovered from such formations than has heretofore been possible.

These and other objects and advantages will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Briefly stated, we have discovered that the addition of a relatively small amount of an N,N-dimethylamide of a carboxylic acid to the fluid used to stimulate the flow of the oil from the oil-bearing formation increases the recovery of oil from such a formation.

Before proceeding with specific examples illustrating our invention, it may be well to indicate in general the nature of the materials required in the process.

Suitable N,N-dimethylamides of carboxylic acids are prepared from straight chain carboxylic acids containing from 12–18 carbon atoms. Although any carboxylic acid containing from 12–18 carbon atoms is suitable in our process, we prefer those containing 18 carbon atoms as such acids are readily available in large quantities at economical costs. These preferred acids are further characterized by having at least one carbon to carbon double bond. Specific acids classified within this category include: oleic, linoleic, linolenic, ricinoleic, and mixtures thereof. Also suitable are the mixed acids found in tall, castor, corn, cottonseed, linseed, olive, peanut, rapeseed, safflower, sesame, and soybean oils. A mixture of carboxylic acids particularly suitable for use in our invention is that available commercially as tall oil fatty acids under the trademark Unitol ACD Special. A typical analysis of this product is as follows:

TABLE

|  | Typical analysis |
|---|---|
| Fatty acids, pct | 97.5 |
| Rosin acids, pct | 1.0 |
| Unsaponifiables, pct | 1.5 |
| Linoleic acid, pct | 45.1 |
| Oleic acid, pct | 49.5 |
| Saturated acid, pct | 1.6 |
| Acid number | 195 |
| Saponification number | 197 |
| Color, Gardner | 3 |
| Specific gravity, 25° C./25° C. | 0.902 |
| Titre, °C. | 2.0 |
| Flash point, °F. | 380 |
| Fire point, °F. | 423 |

Suitable fluid carriers for use in our invention include cold and hot water, steam, and hydrocarbon fluids. As to the hydrocarbon fluids, that may be a hydrocarbon known in the art as a light distillate including naphtha, reformate, pale oil, etc., and fluids such as toluene, diesel fuel, and similar hydrocarbons.

As to the amount of the dimethylamide to be added to the fluid carrier, that may vary from about 0.1 to 200 parts per million parts of the carrier with the preferred range varying from about 0.2 to 100 parts per million parts of the carrier. It will be understood, of course, that larger amounts of the dimethylamide may be added to the carrier, but such added quantities increase the cost of operation without materially increasing the over-all efficiency of the operation.

EXAMPLE 1

In this example the effectiveness of the N,N-dimethylamides prepared from tall oil fatty acids as an aid in the steam recovery of oil from a depleted well was determined as follows:

The specific well used in this project was located in Northeastern Alberta and completed in the Clearwater formation at a depth of about 1800 feet. Production of oil by the "huff and puff" steam process was as follows:

Production Cycle 1 . . . 24 cubic meters of oil
Production Cycle 2 . . . 6 cubic meters of oil
Production Cycle 3 . . . 2 cubic meters of oil The oil so recovered was typically 10 to 12 API° gravity. The steam cycle preceding each of the production cycles was for a period of about 25 days' duration in which the equivalent of 1,000 barrels of water as steam at about 2200 psi wellhead was injected into the well per day. After production cycle 3, the steam cycle was repeated with the exception that the steam injected into the well contained 9 parts of the N,N-dimethylamides of tall oil fatty acids per million parts of water wherein parts are by weight. The amount of oil recovered following steam-N,N-dimethylamide treatment was equal to 240 cubic meters. The oil of this production cycle was typically 15 API° gravity.

Similar results were observed when the N,N-dimethylamides of the fatty acids previously listed, plus the N,N-dimethylamides of lauric, myristic, palmitic, and stearic acids were substituted for the N,N-dimethylamides of tall oil fatty acids.

EXAMPLE 2

In this example, the efficiency of the N,N-dimethylamides of tall oil fatty acids as an aid in the steam recovery of oil from a depleted well was determined as follows:

The specific well used in this project was a well completed in the Lloydminister formation of central Saskatchewan. By the regular "huff and puff" steam recovery method, the amount of oil recovered over a period of ten days was equal to 271 barrels. Following that procedure, the steam cycle was repeated in which 9 parts of the N,N-dimethylamides of tall oil fatty acids per million parts of water was added to the steam. The amount of oil recovered following the steam N,N-dimethylamide treatment was equal to 399 barrels. After 28 days of production, the well was still producing 100 barrels of oil per day. The average percentage of water in the total produced fluid in the regular "huff and puff" method was equal to 85 percent. During the steam-N,N-dimethylamide treatment, the average percentage of water in the total produced fluid was equal to 53 percent.

EXAMPLE 3

The effectiveness of water solutions of the various N,N-dimethylamides prepared from the fatty acids listed below in extracting oil from a bitumen containing sand as compared to water as the sole extractant was determined in this example. A bitumen containing sand sample (270 g) from the McMurray formation of Northeastern Alberta was divided into nine equal portions. To each portion was added 60 ml of water and the pH thereof adjusted to 12 by the addition of sodium hydroxide. Following the adjustment of the pH of each portion, the specific N,N-dimethylamide was added in an amount so that the concentration of N,N-dimethylamide was equal on a weight basis of 90 parts per million parts of water. All portions were maintained at a temperature of 180° F. with agitation for a period of four hours and then quiescence for 16 hours, after which the portions were cooled, the sand recovered and analyzed for bitumen content. The effectiveness of the N,N-dimethylamides and water is summarized in the tabular form as follows:

| N,N-Dimethylamide of fatty acid | Bitumen removed Percent |
| --- | --- |
| none (control) | 34 |
| Lauric acid | 63 |
| Myristic acid | 68 |
| Palmitic acid | 45 |
| Coconut fatty acids | 76 |
| Stearic acid | 58 |

-continued

| N,N-Dimethylamide of fatty acid | Bitumen removed Percent |
| --- | --- |
| Oleic acid | 60 |
| Soybean fatty acids | 73 |
| Tall oil fatty acids | 41 |

Under some conditions it may be desirable to add a nonionic surface active agent to the N,N-dimethylamide to increase the miscibility of the latter in water. When this optional procedure is followed, we have found that a suitable weight ratio of the surface active agent to the N,N-dimethylamide is about 1 to about 9.

While particular embodiments of the invention have been described, it will be understood, of course, that the invention is not limited thereto since many modifications may be made; and it is, therefore, contemplated to cover by the appended claims any such modifications as fall within the spirit and scope of the invention.

The invention having thus been described, what is claimed and desired to be secured by Letters Patent is:

1. A method for recovering oil from an oil-bearing formation which comprises introducing into said formation to displace the oil contained therein a fluid carrier wherein said fluid carrier is water, steam, or a hydrocarbon fluid selected from the group consisting of light distillate, naphtha, reformate, pale oil, toluene, and diesel fuel containing from about 0.25 to about 100 parts by weight of an N,N-dimethylamide of a straight chain carboxylic acid per million parts of said fluid carrier, characterized in that said carboxylic acid contains from 12 to 18 carbon atoms.

2. The method of claim 1 wherein the fluid carrier is steam.

3. The method of claim 1 wherein the fluid carrier is water.

4. The method of claim 1 wherein the fluid carrier is a hydrocarbon fluid.

5. The method of claim 1 wherein the straight chain carboxylic acid is lauric acid.

6. The method of claim 1 wherein the straight chain carboxylic acid is myristic acid.

7. The method of claim 1 wherein the straight chain carboxylic acid is palmitic acid.

8. The method of claim 1 wherein the straight chain carboxylic acid is linoleic acid.

9. The method of claim 1 wherein the straight chain carboxylic acid is linolenic acid.

10. The method of claim 1 wherein the straight chain carboxylic acid is oleic acid.

11. The method of claim 1 wherein the straight chain carboxylic acid is ricinoleic acid.

12. The method of claim 1 wherein the straight chain carboxylic acid is stearic acid.

13. The method of claim 1 wherein the straight chain carboxylic acid is a mixture of straight chain carboxylic acids containing 18 carbon atoms and at least one carbon to carbon double bond.

14. The method of claim 1 wherein the straight chain carboxylic acid is a mixture of acids derived from tall oil.

15. The method of claim 1 wherein the straight chain carboxylic acid is a mixture of acids derived from linseed oil.

16. The method of claim 1 wherein the straight chain carboxylic acid is a mixture of acids derived from soybean oil.

17. The method of claim 1 wherein the straight chain carboxylic acid is a mixture of acids derived from cottonseed oil.

18. The method of claim 1 wherein the straight chain carboxylic acid is a mixture of acids derived from corn oil.

19. The method of claim 1 wherein the straight chain carboxylic acid is a mixture of acids derived from peanut oil.

20. The method of claim 1 wherein the straight chain carboxylic acid is a mixture of acids derived from coconut oil.

* * * * *